(12) United States Patent
Salamon et al.

(10) Patent No.: US 9,015,121 B1
(45) Date of Patent: Apr. 21, 2015

(54) UNIFIED VIRTUAL MACHINE AND DATA STORAGE SNAPSHOTS

(71) Applicants: Victor Salamon, Edmonton (CA); Roel van der Goot, Edmonton (CA); Steven R. Bromling, Edmonton (CA)

(72) Inventors: Victor Salamon, Edmonton (CA); Roel van der Goot, Edmonton (CA); Steven R. Bromling, Edmonton (CA)

(73) Assignee: EMC Corporation, Hopkinton, MA (US)

( * ) Notice: Subject to any disclaimer, the term of this patent is extended or adjusted under 35 U.S.C. 154(b) by 226 days.

(21) Appl. No.: 13/741,644

(22) Filed: Jan. 15, 2013

(51) Int. Cl.
*G06F 17/30* (2006.01)

(52) U.S. Cl.
CPC .............................. *G06F 17/30174* (2013.01)

(58) Field of Classification Search
USPC .......................................... 707/640, 654, 661
See application file for complete search history.

(56) References Cited

U.S. PATENT DOCUMENTS

| | | | |
|---|---|---|---|
| 6,792,518 B2 | 9/2004 | Armangau et al. | |
| 7,054,883 B2 | 5/2006 | Meiri et al. | |
| 7,266,706 B2 | 9/2007 | Brown et al. | |
| 7,340,489 B2 | 3/2008 | Vishlitzky et al. | |
| 7,469,289 B2 * | 12/2008 | Arakawa et al. | 709/224 |
| 7,475,207 B2 | 1/2009 | Bromling et al. | |
| 7,558,926 B1 | 7/2009 | Oliveira et al. | |
| 7,577,722 B1 | 8/2009 | Khandekar et al. | |
| 7,613,890 B1 | 11/2009 | Meiri | |
| 7,831,565 B2 * | 11/2010 | Lee | 707/649 |
| 7,840,595 B1 | 11/2010 | Blitzer et al. | |
| 7,975,018 B2 | 7/2011 | Unrau et al. | |
| 8,046,545 B2 | 10/2011 | Meiri et al. | |
| 8,335,899 B1 | 12/2012 | Meiri et al. | |
| 8,682,852 B1 * | 3/2014 | Salamon et al. | 707/640 |
| 2006/0010300 A1 * | 1/2006 | Arakawa et al. | 711/162 |
| 2007/0174569 A1 * | 7/2007 | Schnapp et al. | 711/162 |
| 2011/0047195 A1 * | 2/2011 | Le et al. | 707/827 |
| 2012/0254123 A1 * | 10/2012 | Ferguson et al. | 707/649 |
| 2012/0272238 A1 * | 10/2012 | Baron | 718/1 |

OTHER PUBLICATIONS

Jane You, A Wavelet-Based Coarse-to-Fine Image Matching Scheme in a Parallel Virtual Machine Environment, vol. 9, Sep. 2000, 13 pages.*
U.S. Appl. No. 12/932,080, filed Feb. 17, 2011, Meiri et al.
U.S. Appl. No. 13/136,359, filed Jul. 29, 2011, Van Der Goot.
U.S. Appl. No. 13/433,885, filed Mar. 29, 2012, Salamon et al.
U.S. Appl. No. 13/537,839, filed Jun. 29, 2012, Palekar et al.
EMC Corporation, "EMC RecoverPoint CDP: Continuous Data Protection for Operational Recovery, Applied Technology," White paper H6181.2, Feb. 2011, 22 pp.
EMC Corporation, "Improving VMware Disaster Recovery with EMC RecoverPoint," White paper H2352.1, May 2008, 17 pp.
U.S. Appl. No. 13/340,958, filed Dec. 30, 2011, Nickurak et al.

* cited by examiner

*Primary Examiner* — Noosha Arjomandi
(74) *Attorney, Agent, or Firm* — Muirhead and Saturnelli, LLC

(57) ABSTRACT

The system described herein provides for unifying the streams of I/O, external VM snapshot triggers and VM internal operations into one in connection with providing for snapshotting of both the data storage of a storage system and one or more associated VMs over time. The system described herein thereby allows recording undo and redo journals for all the streams substantially simultaneously. The system described herein unifies snapshots for data storage and all associated VMs in response to one or more triggers. A tag of the unified snapshots may therefore automatically refer to a point-in-time of both the VM and array data.

22 Claims, 12 Drawing Sheets

UNIFIED VIRTUAL MACHINE AND DATA STORAGE SNAPSHOTS

TECHNICAL FIELD

This application is related to the field of data storage and, more particularly, to systems for managing data and resources in a virtualized environment.

BACKGROUND OF THE INVENTION

In current storage networks, and particularly storage networks including geographically distributed directors (or nodes) and storage resources, preserving or reducing bandwidth between resources and directors while providing optimized data availability and access is highly desirable. Data access may be localized, in part, to improve access speed to pages requested by host devices. Caching pages at directors provides localization, however, it is desirable that the cached data be kept coherent with respect to modifications at other directors that may be caching the same data. An example of a system for providing distributed cache coherence is described in U.S. Pat. No. 7,975,018 to Unrau et al., entitled "Systems and Methods for Providing Distributed Cache Coherency," which is incorporated herein by reference. Other systems and techniques for managing and sharing storage array functions among multiple storage groups in a storage network are described, for example, in U.S. Pat. No. 7,266,706 to Brown et al. entitled "Methods and Systems for Implementing Shared Disk Array Management Functions," which is incorporated herein by reference.

Data transfer among storage devices, including transfers for data replication or mirroring functions, may involve various data synchronization processing and techniques to provide reliable protection copies of data among a source site and a destination site. In synchronous transfers, data may be transmitted to a remote site and an acknowledgement of a successful write is transmitted synchronously with the completion thereof. In asynchronous transfers, a data transfer process may be initiated and a data write may be acknowledged before the data is actually transferred to directors at the remote site. Asynchronous transfers may occur in connection with sites located geographically distant from each other. Asynchronous distances may be distances in which asynchronous transfers are used because synchronous transfers would take more time than is preferable or desired. Particularly for asynchronous transfers, it is desirable to maintain a proper ordering of writes such that any errors or failures that occur during data transfer may be properly identified and addressed such that, for example, incomplete data writes be reversed or rolled back to a consistent data state as necessary.

Reference is made, for example, to U.S. Pat. No. 7,475,207 to Bromling et al. entitled "Maintaining Write Order Fidelity on a Multi-Writer System," which is incorporated herein by reference, that discusses features for maintaining write order fidelity (WOF) in an active/active system in which a plurality of directors (i.e. controllers and/or access nodes) at geographically separate sites can concurrently read and/or write data in a distributed data system. Discussions of data ordering techniques for synchronous and asynchronous data replication processing for other types of systems, including types of remote data facility (RDF) systems produced by EMC Corporation of Hopkinton, Mass., may be found, for example, in U.S. Pat. No. 7,613,890 to Meiri, entitled "Consistent Replication Across Multiple Storage Devices," U.S. Pat. No. 7,054,883 to Meiri et al., entitled "Virtual Ordered Writes for Multiple Storage Devices," and U.S. Pat. No. 8,335,899 to Meiri et al., entitled "Active/Active Remote Synchronous Mirroring," which are all incorporated herein by reference.

In some instances, it is desirable to provide a point-in-time image of a logical volume. An example of a logical point-in-time image of the volume may be a data storage snapshot copy that may be obtained relatively quickly and without significant overhead by creating a data structure initially containing pointers that point to sections of the logical volume. A data storage snapshot does not replicate a full copy of the data set (referred to as a production data set). Rather, the data storage snapshot only stores differences between a current version of the production data set and the version of the data set at the point in time when the snapshot was taken. There are many different specific mechanisms for providing snapshot copies, see, for example, U.S. Pat. No. 7,340,489 to Vishlitzky, et al., entitled "Virtual Storage Devices," and U.S. Pat. No. 6,792,518 to Armangau et al., entitled "Data Storage System Having Mata [Meta] Bit Maps for Indicating Whether Data Blocks are Invalid in Snapshot Copies," which are both incorporated by reference herein. It is noted that although the term "snapshot" is principally used herein, the system described herein applies to any appropriate point-in-time image.

In a virtualized environment, a centralized management infrastructure, that may be referred to as a virtual center, may provide a central point of control for managing, monitoring, provisioning and migrating virtual machines. A virtual machine (VM) is a software implementation of a machine that executes programs like a physical machine. Virtualization software allows multiple VMs with separate operating systems to run in isolation on the same physical server. Each VM may have its own set of virtual hardware (e.g., RAM, CPU, NIC, etc.) upon which an operating system and applications are loaded. The operating system may see a consistent, normalized set of hardware regardless of the actual physical hardware components. The virtual center may operate to control virtual machines in data centers and, for example, in connection with cloud computing. The virtual center may further include a virtual data center that provides logical control and management of data storage in a data center, and provides for sub-dividing contents of virtual components into compute resources, network resources and storage resources.

Configuring and deploying VMs is known in the field of computer science. For example, U.S. Pat. No. 7,577,722 to Khandekar, et al., entitled "Provisioning of Computer Systems Using Virtual Machines," which is incorporated herein by reference, discloses techniques for configuring and deploying a VM according to user specifications. VMs may be provisioned with respect to any appropriate resource, including, for example, storage resources, CPU processing resources and/or memory. Operations of VMs may include using virtual machine images. A VM image may be a point-in-time image or snapshot of the state of the virtual machine as it resides in the host's memory. The VM image may be obtained for an operating VM and transferred to another location where the VM continues execution from the state defined by the virtual machine image. In this way, the VM image may be a snapshot (a VM snapshot) of an execution state of a program by a VM that may be moved between different locations and processing thereafter continued without interruption. Reference is made to U.S. patent application Ser. No. 12/932,080 to Meiri et al., filed Feb. 17, 2011, entitled "VM Mobility Over Distance," and U.S. patent application Ser. No. 13/136,359 to Van der Goot, filed Jul. 29, 2011, entitled "Active/Active Storage and Virtual Machine Mobility Over Asynchronous Distances," which are incorporated herein by reference.

Continuous snapshotting (CS) refers to a process of taking snapshots of any content change in a storage system. In connection with the content being user data, the process may be referred to as continuous data protection (CDP). In a CS/CDP implementation, individual writes to storage are duplicated and stored in a log of activity in one or more journal devices. By replaying these writes in reverse, storage may be "rolled back" (a roll-back) to any past state which was covered by the logs. This may be done on production storage, or in a duplicate copy of the storage to avoid disruption to users of the production storage. In the latter case, when access to historic data is no longer required, the log may be replayed again in forward order (a roll-forward) to restore the duplicate to the production state and possibly including logged writes that occurred since roll-back. An example of a product that provides continuous data protection with multiple recovery points to restore applications instantly to a specific point in time is RecoverPoint by EMC Corporation of Hopkinton, Mass.

Content protected by point-in-time images, such as snapshots, e.g. in connection with continuous snapshotting techniques, may be extended to include not only user data but further include configuration metadata, and/or other appropriate configuration information of the state of an associated VM (VM snapshots). The VM snapshots may include information used for configuration volumes, storage devices, consistency groups and/or other appropriate storage management system elements, as further discussed elsewhere herein. A user may want to roll-back a storage management system to a past state of a VM due to performance or stability issues attributed to configuration changes.

For further discussion of techniques for providing continuous data protection, reference is made, for example, to U.S. Pat. No. 8,046,545 to Meiri et al., entitled "Continuous Backup," which discloses a system for providing continuous backup of a storage device and restoring the storage device to prior states; U.S. Pat. No. 7,558,926 to Oliveira et al., entitled "Continuous Data Backup Using Distributed Journaling," which discloses techniques for providing continuous data backups of primary storage using distributed journals; and U.S. Pat. No. 7,840,595 to Blitzer et al., entitled "Techniques for Determining An Implemented Data Protection Policy," which discloses features of determining a data protection method in accordance with a facility and replication type associated with each of one or more selected recovery points of one or more storage objects. The above-noted references are incorporated herein by reference.

Users of storage management systems may make use of snapshot products, and/or other point-in-time data copy products, to establish a line of "history" for all the user data that flows through the system and/or for VM snapshots for past states of one or more associated VMs. However, known technologies do not efficiently allow online roll-back or roll-forward of live virtual machines. Accordingly, it would be desirable to provide for a system that advantageously enables live roll-back and roll-forward of VM and data storage.

SUMMARY OF THE INVENTION

According to the system described herein, a method for performing point-in-time image processing in a storage system is provided. The method includes creating a unified point-in-time image of data storage in the storage system and a state of a virtual machine associated with the data storage in the storage system, wherein the unified point-in-time image combines information of the data storage and the state of the virtual machine. The unified point-in-time image may be stored in a journal device. The unified point-in-time image enables the storage system to revert from a current state operating with a current data storage state and a current state of the virtual machine to a point-in-time operational state defined by the data storage and the state of the virtual machine according to the unified point-in-time image stored in the journal device. The unified point-in-time image may be accessed to revert a state of the storage system from the current state to the point-in-time state defined by the unified point-in-time image. The state defined by the unified point-in-time image includes the data storage and the state of the virtual machine according to the unified point-in-time image for a desired point-in-time. The virtual machine may be operating live when the state of the storage system is reverted to the state defined by the unified point-in-time image. The method may further include isolating the virtual machine from external triggers; rolling back or rolling forward to the state defined by the unified point-in-time image; and resuming operation of the virtual machine. The method may further include maintaining the virtual machine in the current state; instantiating a new virtual machine; and operating the new virtual machine in the point-in-time state using the unified point-in-time image stored in the journal device. Storing the unified point-in-time image in the journal device may be performed asynchronously with creating the unified point-in-time image. The unified point-in-time image may be tagged with an identifier. The journal device may include a redo log and an undo log. The journal device may be accessed to revert a state of the storage system from the current state to the point-in-time state defined by the unified point-in-time image by replaying or reversing actions represented in the journal device using the redo log or the undo log. Reversing the actions represented in the journal log may include performing inverse operations of the undo log. Replaying or reversing the actions represented in the journal log may be performed using a variable CPU speed.

According further to the system described herein, a non-transitory computer readable medium stores software for performing point-in-time image processing in a storage system. The software includes executable code that creates a unified point-in-time image of data storage in the storage system and a state of a virtual machine associated with the data storage in the storage system. The unified point-in-time image combines information of the data storage and the state of the virtual machine. Executable code is provided that stores the unified point-in-time image in a journal device. The unified point-in-time image enables the storage system to revert from a current state operating with a current data storage state and current state of the virtual machine to a point-in-time operational state defined by the data storage and the state of the virtual machine according to the unified point-in-time image stored in the journal device. Executable code may be provided that accesses the unified point-in-time image to revert a state of the storage system from the current state to the point-in-time state defined by the unified point-in-time image, wherein the point-in-time state defined by the unified point-in-time image includes the data storage and the state of the virtual machine according to the unified point-in-time image for a desired point-in-time. The virtual machine may be operating live when the state of the storage system is reverted to the state defined by the unified point-in-time image. Executable code may be provided that isolates the virtual machine from external triggers. Executable code may be provided that rolls back or rolls forward to the state defined by the unified point-in-time image. Executable code may be provided that resumes operation of the virtual machine. Executable code may be provided that maintains the virtual machine in the current state. Executable code may be provided that instantiates a new virtual machine. Executable code may be provided that operates the new virtual machine in the point-in-time state using the unified point-in-time image stored in the journal device. Storing the unified point-in-time image in the journal device may be performed asynchronously with creation of the unified point-in-time image. Executable code may be provided that tags the unified point-in-time image with an identifier. The journal device may include a redo log and an undo log. Executable code may be provided that accesses the journal device to revert a state of the storage system from the current state to the point-in-time state defined by the unified point-in-time image by replaying or reversing actions represented in the journal device using the redo log or the undo log. Reversing the actions represented in the journal log may include performing inverse operations of the undo log. Replaying or reversing the actions represented in the journal log may be performed using a variable CPU speed.

According further to the system described herein, a point-in-time image processing system includes a storage system having a data array that is accessed by at least one virtual machine operating on the storage system. A point-in-time image device creates a unified point-in-time image of data storage in the storage system and a state of a virtual machine associated with the data storage in the storage system. The unified point-in-time image combines information of the data storage and the state of the virtual machine. A journal device stores the unified point-in-time image in a journal device, wherein the unified point-in-time image enables the storage system to revert from a current state operating with a current data storage state and current state of the virtual machine to a point-in-time operational state defined by the data storage and the state of the virtual machine according to the unified point-in-time image stored in the journal device. An accessing device may access the unified point-in-time image to revert a state of the storage system from the current state to the point-in-time state defined by the unified point-in-time image. The point-in-time state defined by the unified point-in-time image includes the data storage and the state of the virtual machine according to the unified point-in-time image for a desired point-in-time. The virtual machine may be operating live when the state of the storage system is reverted to the state defined by the unified point-in-time image. The method may further include isolating the virtual machine from external triggers; rolling back or rolling forward to the state defined by the unified point-in-time image; and resuming operation of the virtual machine. The virtual machine may be maintained in the current state; a new virtual machine may be instantiated; and the new virtual machine may be operated in the point-in-time state using the unified point-in-time image stored in the journal device. Storing the unified point-in-time image in the journal device may be performed asynchronously with creating the unified point-in-time image. The unified point-in-time image may be tagged with an identifier. The journal device may include a redo log and an undo log. The journal device may be accessed to revert a state of the storage system from the current state to the point-in-time state defined by the unified point-in-time image by replaying or reversing actions represented in the journal device using the redo log or the undo log. Reversing the actions represented in the journal log may include performing inverse operations of the undo log. Replaying or reversing the actions represented in the journal log may be performed using a variable CPU speed.

BRIEF DESCRIPTION OF THE DRAWINGS

Embodiments of the system described herein are explained with reference to the several figures of the drawings, which are briefly described as follows.

DETAILED DESCRIPTION OF VARIOUS EMBODIMENTS

Figure 1:
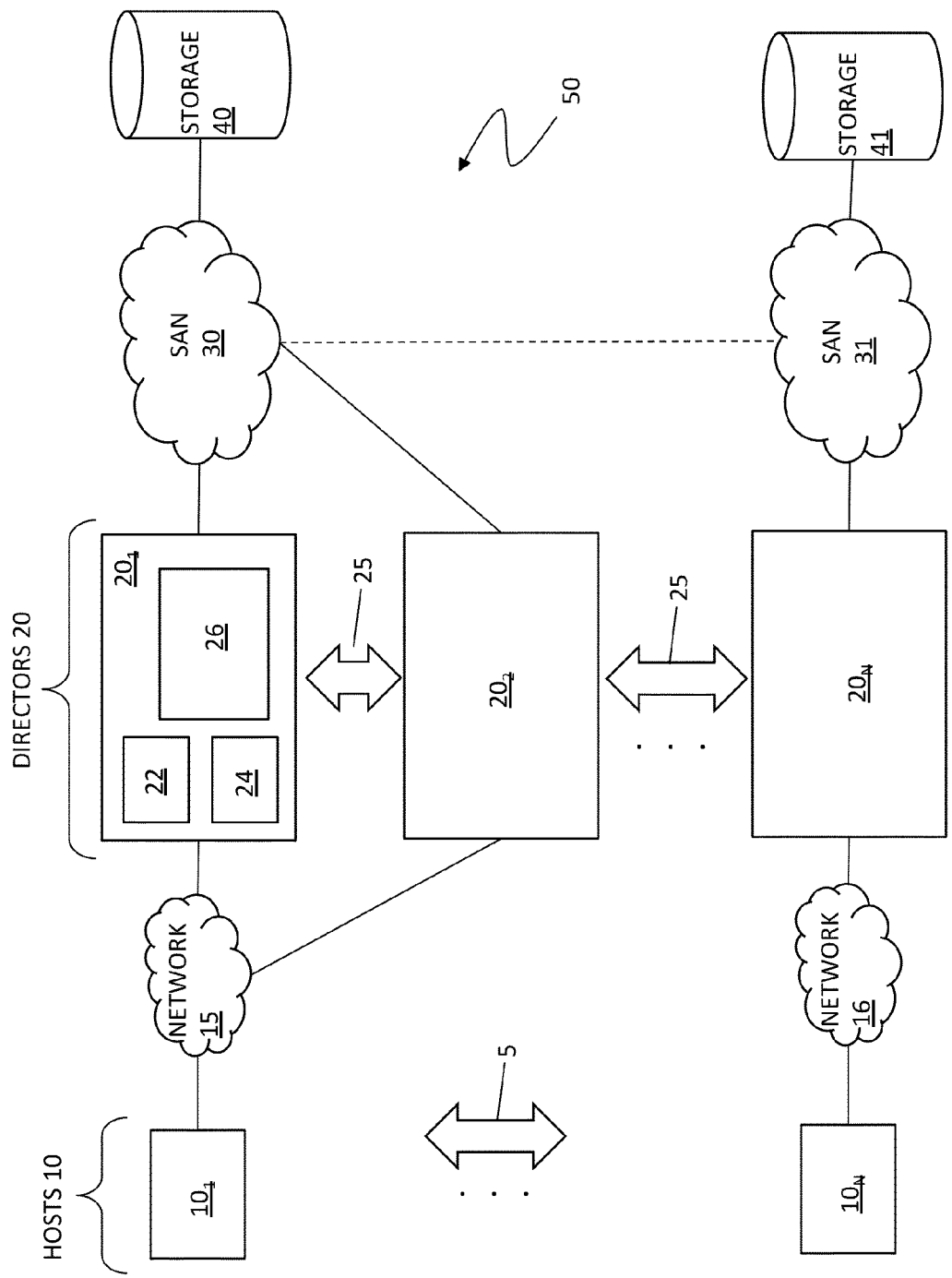
FIG. 1 shows a network configuration of a distributed storage system that may be used in accordance with an embodiment of the system described herein.

FIG. 1 shows a network configuration of a distributed storage system 50 that may be used in accordance with an embodiment of the system described herein. As shown, a plurality of host devices 10 ($10_1$ to $10_N$) are communicably coupled with a plurality of directors 20 ($20_1$, $20_2$ to $20_N$). Each of the directors 20 may include a processor (CPU) component 22, such as a microprocessor or other intelligence module, a cache component 24 (e.g., RAM cache), an instance of a distributed cache manager 26 and/or other local storage and communication ports. In general, "N" is used herein to indicate an indefinite plurality, so that the number "N" when referred to one component does not necessarily equal the number "N" of a different component. For example, the number of hosts 10 may or may not equal the number of directors 20 in FIG. 1. Cache memory may generally be considered memory that is faster and more easily accessible by a processor than other non-cache memory used by a device.

Each of the hosts 10 may be communicably coupled to one or more of directors 20 over one or more network connections 15, 16. It is noted that host devices 10 may be operatively coupled with directors 20 over any of a number of connection schemes as required for the specific application and geographical location relative to each of the directors 20, including, for example, a direct wired or wireless connection, an Internet connection, a local area network (LAN) type connection, a wide area network (WAN) type connection, a VLAN, a proprietary network connection, a Fibre channel (FC) network etc. Furthermore, hosts may also be coupled to one another via the networks 15, 16 and/or operationally via a different network 5 and several of the hosts 10 may be clustered together at one or more sites in which the sites are geographically distant from one another. It is also noted that in various embodiments the networks 15, 16 may be combined with the SAN networks 30, 31.

Each of the directors 20 may also include, or be communicably coupled with, one or more file systems, such as a virtual machine file system (VMFS), a new technology file system (NTFS) and/or other appropriate file system, and may be communicably coupled with one or multiple storage resources 40, 41, each including one or more disk drives and/or other storage volumes, over one or more storage area networks (SAN) 30, 31, and/or other appropriate network, such as a LAN, WAN, etc. The directors 20 may be located in close physical proximity to each other, and/or one or more may be remotely located, e.g., geographically remote, from other directors, as further discussed elsewhere herein. It is possible for the SANs 30, 31 to be coupled together, and/or for embodiments of the system described herein to operate on the same SAN, as illustrated by a dashed line between the SAN 30 and the SAN 31. Each of the directors 20 may also be able to intercommunicate with other directors over a network 25, such as a public or private network, a peripheral component interconnected (PCI) bus, a Fibre Channel (FC) network, an Ethernet network and/or an InfiniBand network, among other appropriate networks. In other embodiments, the directors may also be able to communicate over the SANs 30, 31 and/or over the networks 15, 16. Several of the directors 20 may be clustered together at one or more sites and in which the sites are geographically distant from one another. The system described herein may be used in connection with a VPLEX product produced by EMC Corporation of Hopkinton, Mass. and/or a vSphere product produced by VMware Inc. of Palo Alto, Calif. The system described herein may also be used in connection with an storage product produced by EMC Corporation, such as a Symmetrix product. Although principally discussed and illustrated in connection with embodiment for a distributed storage system, the system described herein may generally be used in connection with any appropriate distributed processing system.

Each distributed cache manager 26 may be responsible for providing coherence mechanisms for shared data across a distributed set of directors. In general, the distributed cache manager 26 may include a module with software executing on a processor or other intelligence module (e.g., ASIC) in a director. The distributed cache manager 26 may be implemented in a single director or distributed across multiple intercommunicating directors. In certain aspects, each of the directors 20 may be embodied as a controller device, or blade, communicably coupled to one or more of the SANs 30, 31 that allows access to data stored on the storage networks. However, it may be appreciated that a director may also be embodied as an intelligent fabric switch, a hub adapter and/or other appropriate network device and may also be implemented as a virtual machine, as further discussed elsewhere herein. Because Locality Conscious Directory Migration (LCDM) is applicable to databases, any suitable networked director may be configured to operate as an access node with distributed cache manager functionality. For example, a distributed cache manager may be run on one or more desktop computers and/or virtual machines with a network connection.

A distributed storage system may enable a storage device to be exported from multiple distributed directors, which may be either appliances or arrays, for example. In an active/active storage system, if there are multiple interfaces to a storage device, each of the interfaces may provide equal access to the storage device. With an active/active storage system, hosts in different locations may have simultaneous write access to mirrored exported storage device(s) through a local front-end thereof (i.e., a director). The distributed storage system may be responsible for providing globally consistent and coherent data access. The system described herein may be used in connection with enabling the distributed storage system to meet consistency guarantees and maximize data access even in response to failures that may cause inconsistent data within the distributed storage system.

Using virtualization software, one or more physical servers may be subdivided into a plurality of virtual machines. As further discussed elsewhere herein, a virtual machine (VM) is a software implementation of a machine that executes programs like a physical machine. Virtualization software allows multiple VMs with separate operating systems to run in isolation on the same physical server. Each VM may have its own set of virtual hardware (e.g., RAM, CPU, NIC, etc.) upon which an operating system and applications are loaded. The operating system may see a consistent, normalized set of hardware regardless of the actual physical hardware components. The term "virtualization software" is used herein to generally refer to any and all software that supports the operation of one or more VMs. A number of virtualization software products exist, including the VMware product family provided by VMware, Inc. of Palo Alto, Calif. A benefit of providing VMs is the ability to host multiple, unrelated, clients in a single physical server. The virtualization software may maintain separation of each of the clients, and in which each of the clients separately access their own virtual server(s). Other virtualization products that may be used in connection with the system described herein include Hyper-V by Microsoft Corporation of Redmond, Wash., public license virtualization products and/or other appropriate virtualization software.

As discussed in detail elsewhere herein, in a virtualized environment, a virtual center, an example of which may be a vCenter product produced by VMware, Inc. of Palo Alto, Calif., may provide a central point of control for managing, monitoring, provisioning and migrating virtual machines. Virtual centers may operate to control virtual machines in data centers and, for example, in connection with cloud computing. A virtual center may further include a virtual data center that provides logical control and management of data storage in a data center. A virtual center may be used in connection with an infrastructure platform that provides an integrated package of components to provide network, compute and/or storage services for use in a virtualized environment. One example of an infrastructure platform is a Vblock product produced by VCE Company, LLC of Richardson, Tex. It is noted that the term "Vblock" used herein may also be generally understood as including and referring to any appropriate software and/or component packages of a converged infrastructure product that provides network, compute and/or storage services for use in a virtualized computing environment. For example, other suitable types of converged infrastructure products may include EMC Corporation's VMAX SP and/or VSPEX products. Management of a Vblock and/or other appropriate type of converged infrastructure product may be provided by an appropriate software element. For example, EMC's Ionix Unified Infrastructure Manager (UIM) may be integrated with Vblock and provide a management console for management of the Vblock package.

Figure 2:
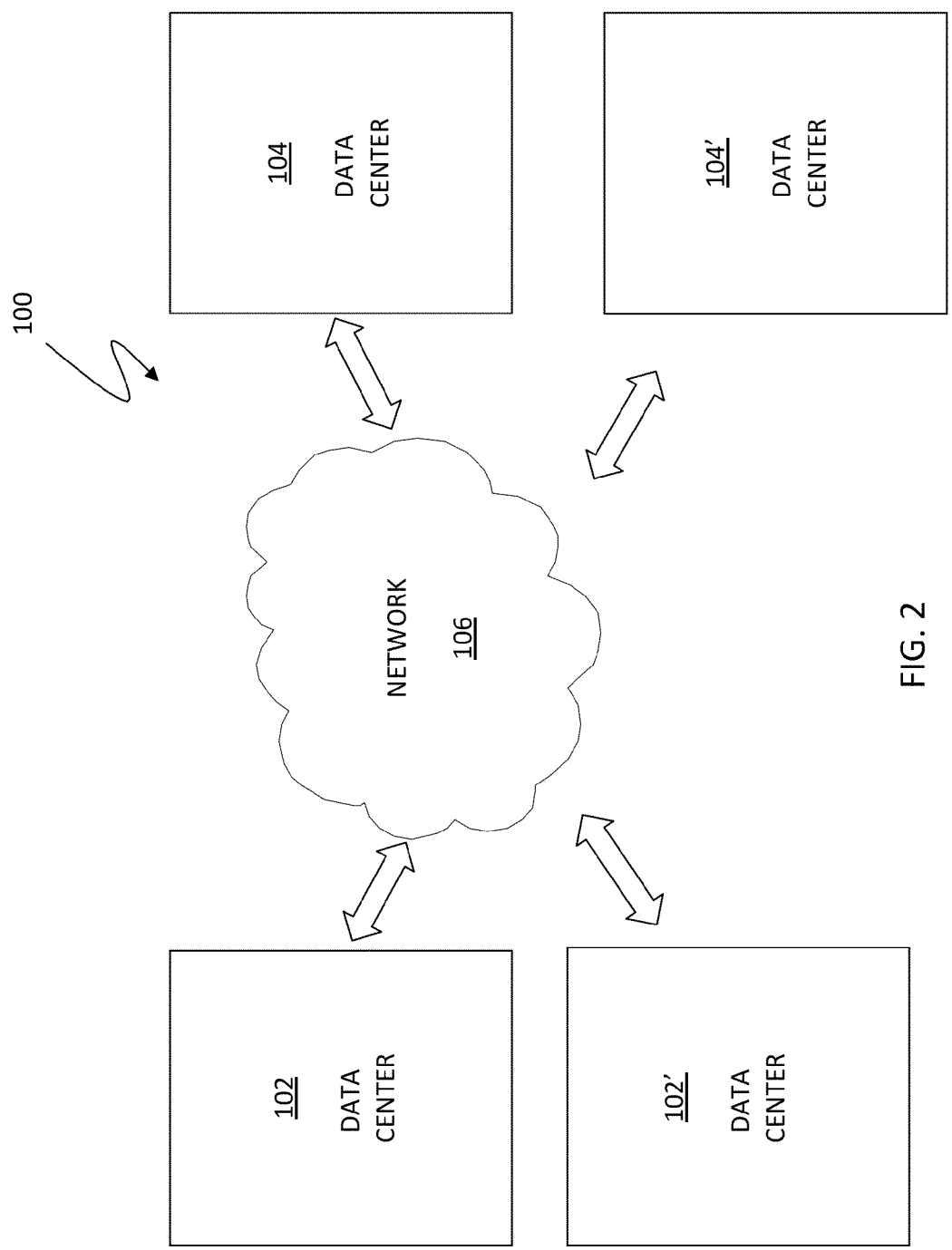
FIG. 2 is a schematic illustration showing a system that includes a plurality of data centers in communication via a network that may be used in accordance with an embodiment of the system described herein.

FIG. 2 is a schematic illustration showing a system 100 that includes a first data center 102 in communication with a second data center 104 via a network 106. Although the following embodiments are discussed principally in connection with data centers 102, 104 any number of additional data centers, represented as data centers 102', 104', may be also be used in connection with the system described herein. Each of the data centers 102, 104 may include a plurality of storage devices and processors (not shown in FIG. 2) for executing applications using a plurality of VMs and which may be controlled and/or managed in connection with one or more virtual centers and virtual data centers. The VMs may be configured using any appropriate server virtualization technology, such as that provided by VMware, Inc. of Palo Alto, Calif., including vSphere. VSphere is a suite of tools/applications offering the ability to perform cloud computing utilizing enterprise-level virtualization products such as VMware's ESX and/or ESXi. VSphere allows multiple VMs to run on any ESX host. Other VM technology may be used including any appropriate VM technology provided by other vendors.

The data centers 102, 104 may contain any number of processors and storage devices that are configured to provide the functionality described herein. In an embodiment herein, the storage devices may be Symmetrix storage arrays provided by EMC Corporation of Hopkinton, Mass. Other appropriate types of storage devices and different types of processing devices may also be used in connection with the system described herein. The data centers 102, 104 may be configured similarly to each other or may be configured differently. The network 106 may be any network or similar mechanism allowing data communication between the data centers 102, 104. In an embodiment herein, the network 106 may be the Internet and/or any other appropriate network and each of the data centers 102, 104 may be coupled thereto using any appropriate mechanism. In other embodiments, the network 106 may represent a direct connection (e.g., a physical connection) between the data centers 102, 104.

In various embodiments, VMs may be migrated from a source one of the data centers 102, 104 to a destination one of the data centers 102, 104. VMs may be transferred from one data site to another, including VM mobility over geographical distances, for example, for reasons of disaster avoidance, load balancing and testing, among other reasons. For a discussion of migrating VMs, reference is made to U.S. patent application Ser. No. 12/932,080 to Meiri et al., filed Feb. 17, 2011, entitled "VM Mobility Over Distance," and U.S. patent application Ser. No. 13/136,359 to Van Der Goot, filed Jul. 29, 2011, entitled "Active/Active Storage and Virtual Machine Mobility Over Asynchronous Distances," which are incorporated herein by reference. A product, such as EMC's VPLEX Metro and/or VPLEX Geo, may be used to enable the resources of disparate storage systems in dispersed data centers to be federated and/or coordinated and utilized as a single pool of virtual storage. VPLEX allows for logical storage units (e.g., logical unit numbers (LUNs)), provisioned from various storage arrays, to be managed through a centralized management interface. Products like VPLEX Metro or Geo provide for data mobility, availability and collaboration through active/active data over synchronous and asynchronous distances with provide for the ability to non-disruptively move many VMs. It is noted that the term "VPLEX" used herein may also generally be understood to refer to and include any appropriate software and/or component packages that provide for coordinating and/or federating resources of disparate systems as a single pool of virtual resources, in particular, for example, a single pool of virtual storage.

Figure 3:
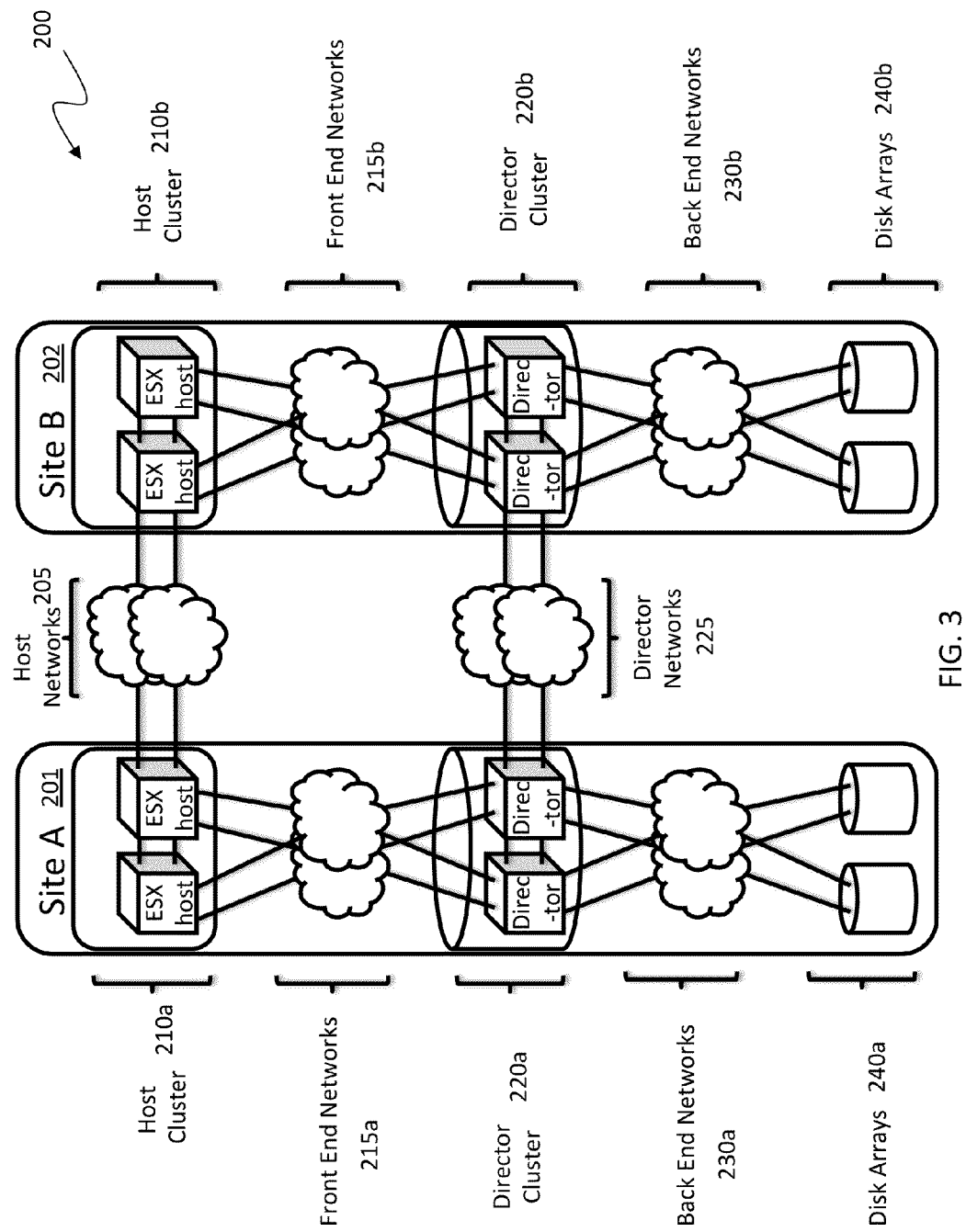
FIG. 3 is a schematic illustration showing a distributed storage system with multiple sites according to an embodiment of the system described herein.

FIG. 3 is a schematic illustration showing a distributed storage system 200 having multiple sites according to an embodiment of the system described herein. Although illustrated with two sites, Site A 201 and Site B 202, the system described herein may also operate in connection with additional sites. Although components are specifically identified with respect to Site A 201, Site B 202 (or any additional site) may also include the components discussed herein. The sites 201, 202 may include one or more hosts grouped in host clusters 210a,b, one or more directors grouped in director clusters 220a,b, and disk arrays 240a,b. Each host cluster 210a,b and director cluster 220a,b may each include software and/or other controllers or interfaces to control or administer operations in connection with described functions of the hosts and directors. In an embodiment, each host cluster 210a,b may include hosts, such as ESX hosts, in a vSphere cluster and each director cluster 220a,b may include directors in a VPLEX cluster. It is noted that although ESX hosts and illustrated and discussed herein as examples, any appropriate host may be used in connection with the system described herein. Front end networks 215a,b may connect through host links to the host clusters 210a,b and through front end links to the director clusters 220a,b. One or more back end networks 230a,b may connect through back end links to the director clusters 220a,b and through array links to the disk arrays 240a,b. In an embodiment, the front and back end networks may be Fibre Channel networks. The front end networks 215a,b allow the hosts (or VMs running therein) to perform I/O operations with the host clusters 210a,b, while the back end networks 230a,b allow the directors of the director clusters 220a,b to perform I/O on the disk arrays 240a,b. One or more host networks 205, such as vSphere Ethernet networks, connect the ESX hosts in host clusters 210a,b. One or more director networks 225 connect the directors of the director clusters 220a,b.

Various types of failures, including network failures within a cluster, may result in behaviors that are further discussed elsewhere herein. It should be noted that the host cluster 210a,b (e.g., vSphere cluster) may be connected in such a way that VMs can keep their network (e.g., IP, FC, IB) addresses when migrating between clusters (for example, by means of a vLan or an open vSwitch). In an embodiment, VPLEX may be used and configured to expose one or more distributed volumes from both VPLEX director clusters. A VMFS may be created on top of these distributed volumes allowing VMs that migrate between the sites to see the same file system in either site. It is also noted that, as illustrated and according to various embodiments, each site 201, 202 may include redundancies in hosts, directors and links therebetween.

In some embodiments, the system described herein may be used in connection with a first set of one or more data centers that are relatively active (primary data centers) and a second set of one or more data centers that are relatively inactive (failover data centers). The first set of data centers and second set of data centers may both be used for application reading and writing, but the first set of data centers may be more active and/or include more response time sensitive applications than the second set of data centers. Each of the relatively active data centers in the first set of data centers may use at least one corresponding data center in the second set of data centers for failover operations. It should also be noted that in addition to the active/active system described herein, the system described herein may also be used in active/passive functioning as appropriate or desired.

I/O access may be provided to distributed volumes in an active/active system with two sites separated by an asynchronous latency. For asynchronous operation, a write operation to cluster at a remote site may be acknowledged as soon as a protection copy is made within the cluster. Sometime later the write data is synchronized to the remote site. Similarly, writes to the remote site are later synchronized to a cluster at the local site. Software or other controllers at the director clusters, such as VPLEX, may present the same image of the data on either cluster to provide a cache-coherent view of the data. In an embodiment, this may be achieved by fetching data that has not yet been replicated between a source and destination site (i.e. "dirty" data; as compared with "clean" data which has been copied and is protected on multiple sites) over the inter-cluster link on an as needed basis. In the background, the controller (VPLEX) may synchronize the dirty data between the clusters.

The above operations may work as long as the inter-cluster network is available. If the inter-cluster link fails, both clusters may contain dirty data that is unknown by the respective remote clusters. As a consequence of this failure, the director cluster may roll-back the image of the data to a write order consistent point. In other words, the director cluster may roll-back the image of the data to a point where it knows the data that is available on both clusters, or to a time where the write data was exchanged between both sites. The director cluster may also guarantee roll-back to an image of the disk or volume that is write order consistent, which means that if the data of a specific write is available on the volume, all data of writes that were acknowledged before ("preceded") that write should be present too. Write order consistency is a feature that allows databases to recover by inspecting the volume image. Known techniques may provide write order consistency by grouping writes in what are called deltas and providing the consistency on a delta boundary basis. Reference is made to U.S. Pat. No. 7,475,207 to Bromling et al., entitled "Maintaining Write Order Fidelity on a Multi-Writer System," that discloses a system for maintaining write order fidelity (WOF) for totally active storage system implementations using WOF groups and including application to features such as point-in-time snapshots and continuous data protection, and to U.S. Pat. No. 7,054,883 to Meiri et al., entitled "Virtual Ordered Writes for Multiple Storage Devices," that discloses features for ordering data writes among groups of storage devices. The above-noted references are incorporated herein by reference.

Suspend/resume migration processing may involve suspending a VM in the source site and resuming that VM in the destination site. Before the suspended VM is resumed, all dirty data for the affected VMFS may be synchronized from the source VPLEX cluster to the destination VPLEX cluster, and the preference (i.e. "winner" site) for the distributed volume may be changed from the source cluster to the destination cluster. The preference attribute may be related to a VPLEX consistency group that contains one or more VMs. Hence, the VM may be in a consistency group of its own or all VMs in a consistency group may be migrated together. To know when the synchronization of VPLEX's dirty cache is finished, the customer may map the VMFS to a distributed volume.

Failures may also occur when a VM is migrated while performing I/O operations. In an example, the migration of a VM during I/O operations may be referred to herein as "vMotion" and may be facilitated by a VMware product called vMotion. In a director network failure situation during VM migration, both the source cluster directors and the destination cluster directors may contain dirty data. A similar problem may occur when multiple VMs have to be migrated together because they all access one VMFS volume. In an embodiment, this problem could be alleviated by suspending the restart of the VM on the destination cluster until the director cluster (e.g., VPLEX cluster) cache has been synchronized; however, such operation may cause undesirable delays. For further detailed discussion of specific system behaviors in connection with different types of failure scenarios, reference is made to U.S. patent application Ser. No. 13/136,359 to Van Der Goot, filed Jul. 29, 2011, entitled "Active/Active Storage and Virtual Machine Mobility Over Asynchronous Distances," which is incorporated herein by reference.

Figure 4:
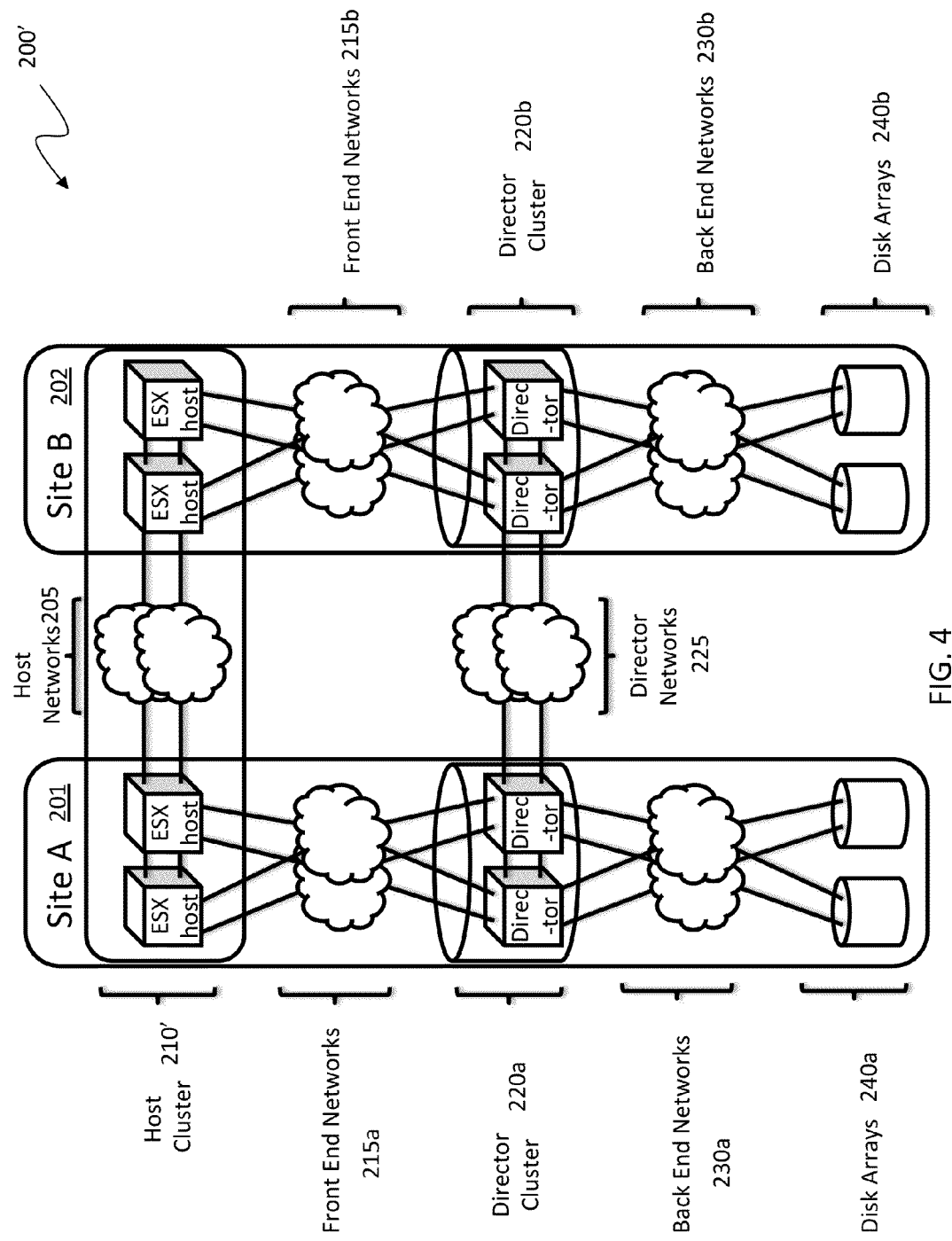
FIGS. 4 and 5 show alternative configurations of distributed storage systems that may be used in accordance with embodiments of the system described herein.
Figure 5:
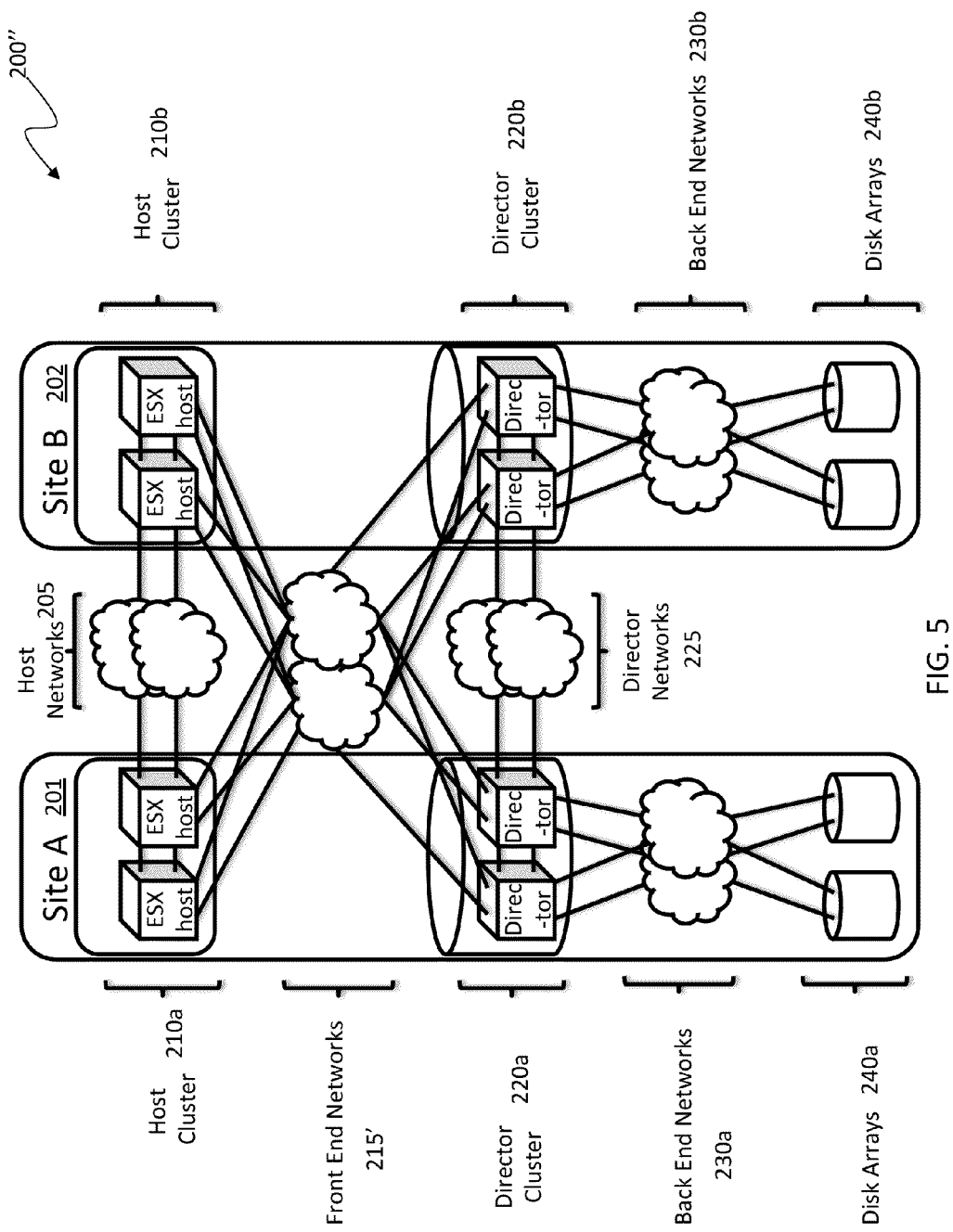

FIGS. 4 and 5 show alternative configurations for distributed storage systems that may be used in accordance with embodiments of the system described herein. In FIG. 4, a distributed storage system 200' is shown that includes a host cluster 210' as a distributed processing layer operating across the multiple sites 201, 202 and otherwise having elements like that discussed elsewhere herein. In FIG. 5, a distributed storage system 200" is shown in which the front end networks 215' are shown operating as an external network accessed by each of the sites 201, 202 and otherwise having elements like that discussed elsewhere herein.

Figure 6:
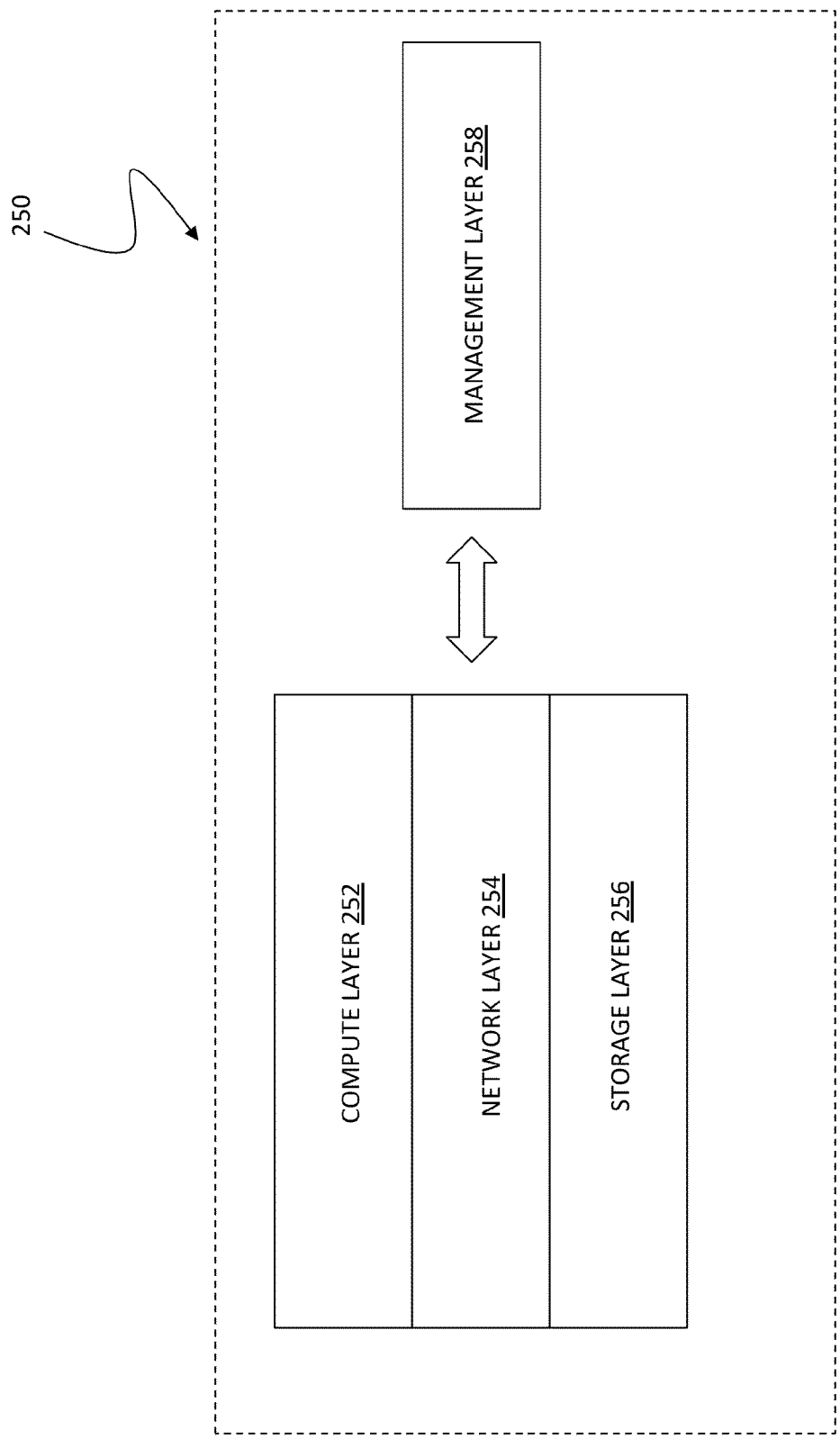
FIG. 6 shows an exemplary cloud computing system that may be used in connection with various embodiments of the system described herein in a manner similar to that discussed herein in connection with other types of distributed processing systems.

FIG. 6 shows an exemplary cloud computing system 250 that may be used in connection with various embodiments of the system described herein in a manner similar to that discussed herein in connection with other types of distributed processing systems. The system 250 may include a compute layer 252, a network layer 254, a storage layer 256 and/or a management layer 258. The system 250 may be understood as providing a cloud computing environment or platform that may be used in connection with cloud storage and/or other appropriate cloud processing applications. The layers 252, 254, 256 and 258 may be coupled together via one or more appropriate networks. In various embodiments, the compute layer 252 may include components, such as blade servers, chassis and fabric interconnects that provide the computing power for the cloud computing system. The storage layer 256 may include the storage components for the cloud computing system, such as one or more storage products produced by EMC Corporation. The network layer 254 may include one or more components that provide switching and routing between the compute 252 and storage 256 layers within systems and/or between multiple cloud computing systems and to the client or customer network. The management layer 258 may provide one or more components used to manage one or more of the layers 252, 254 and/or 256. In an embodiment, the management layer 258 may include EMC Corporation's Unified Infrastructure Manager (UIM).

Figure 7:
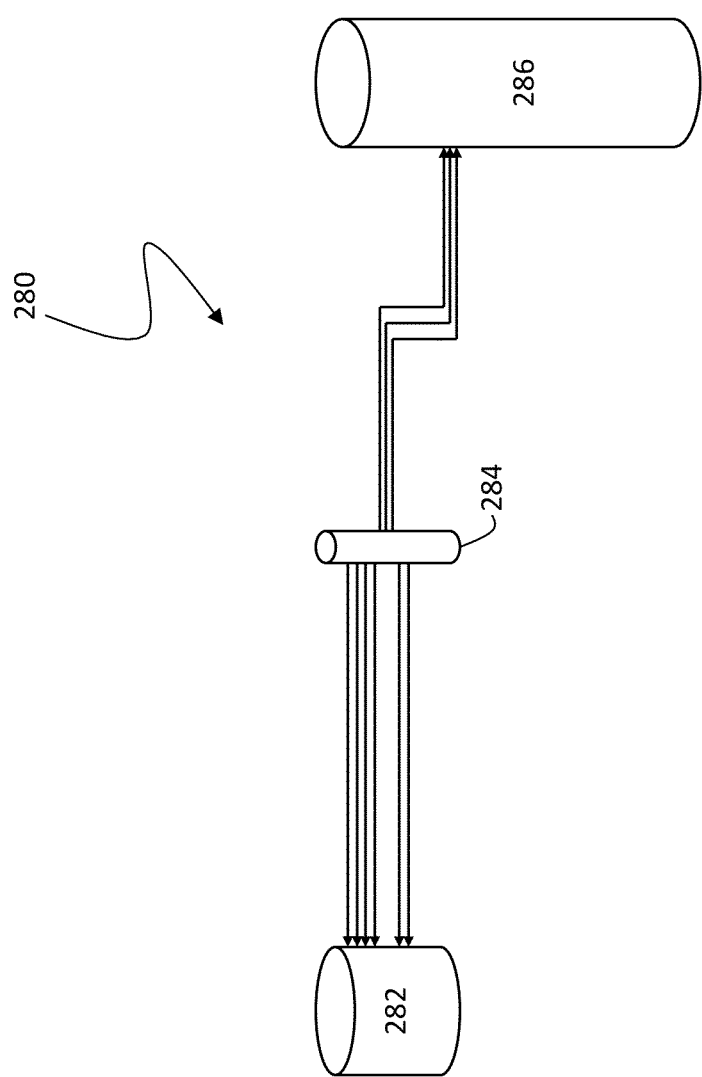
FIG. 7 is a schematic diagram showing a storage device, a point-in-time copy device, and a journal (or log) device that may be used in connection with an embodiment of the system described herein

FIG. 7 is a schematic diagram 280 showing a logical or physical storage device 282, a point-in-time copy device 284, such as a snapshot copy device and/or other appropriate point-in-time copy device, and a journal (or log) device 286 that may be used in connection with an embodiment of the system described herein. The storage device 282 may be implemented using any appropriate storage device mechanism, such as logical or physical storage devices used on a Symmetrix and/or VPLEX product provided by EMC Corporation, and used to access corresponding physical storage disks. Similarly, the point-in-time copy device 284 may be any device that can provide point-in-time copy functionality for the storage device 282. As discussed herein, the point-in-time copy device 284 may provide a point in time copy of all or a portion of the storage device 282. In various embodiments, the point-in-time copy device 284 may be incorporated in the storage device 282 and/or may be located separately from the storage device 282. In an embodiment, the point-in-time copy device 284 is not used and instead the storage device 282 logs its changes to the journal device 286. In an embodiment, a host coupled to a storage device that accesses the point-in-time copy device 284 may access the point-in-time copy device 284 in the same way that the host would access the storage device 282. However, the point-in-time copy device 284 does not contain any track data from the storage device 282. Instead, the point-in-time copy device 284 includes a plurality of table entries that point to tracks on either the storage device 282 or the journal device 286.

In an embodiment, when the point-in-time copy device 284 is established (e.g., when a point in time copy is made of the storage device 282), the point-in-time copy device 284 is includes appropriate table entries that, at the time of establishment, point to tracks of the storage device 282. A host accessing the point-in-time copy device 284 to read a track would read the appropriate track from the storage device 282 based on the table entry of the point-in-time copy device 284 pointing to the track of the storage device 282.

After the point-in-time copy device 284 has been established, it is possible for a host to write data to the storage device 282. In that case, the previous data that was stored on the storage device 282 is copied to the journal device 286, for example, to an undo log of the journal device 286, as further discussed elsewhere herein, and the table entries of the point-in-time copy device 284 that previously pointed to tracks of the storage device 282 would be modified to point to the new tracks of the journal device 286 to which the data had been copied. Thus, a host accessing the point-in-time copy device 284 would read either tracks from the storage device 282 that have not changed since the point-in-time copy device 284 was established or, alternatively, would read corresponding tracks from the journal device 286 that contain data copied from the storage device 282 after the point-in-time copy device 284 was established.

In an embodiment, hosts would not have direct access to the journal device 286. That is, the journal device 286 may be used exclusively in connection with the point-in-time copy device 284 (and possibly other point-in-time copy devices). In addition, for an embodiment described herein, the storage device 282, the point-in-time copy device 284, and the journal device 286 may be provided on a single storage device. However, it is also possible to have portions of one or more of the storage device 282, the point-in-time copy device 284, and/or the journal device 286 provided on separate storage devices that are appropriately interconnected. The journal device 286, and/or other journal devices discussed herein, may be provided by a pool of journal devices that are managed by the storage device and/or other controller coupled to the SAN. In that case, as a point-in-time copy device requires additional tracks of a journal device, the point-in-time copy device would cause more journal device storage to be created (in the form of more tracks for an existing journal device or a new journal device) using the journal device pool mechanism. Pooling storage device resources in this manner is known in the art. Other techniques that do not use pooling may be used to provide journal device storage.

It is noted that the system described herein may be used with data structures and copy mechanisms other than tables and/or pointers to tracks discussed, for example, in connection with snapshots and/or other point-in-time copies. For example, the system described herein may also operate in connection with use of clones and/or deep copy backups automatically synchronized between data and metadata. Accordingly, the system described herein may be applied to any appropriate point-in-time copy processing systems and techniques, and it should be understood that the discussions herein with respect to the creation and use of snapshots, and the devices thereof, may be equally applied to the use of any appropriate point-in-time image used for point-in-time copy processes in connection with protection of data and configuration metadata that enable the rolling back/forward of a storage system using the point-in-time images of the data and configuration metadata according to the system described herein.

U.S. patent application Ser. No. 13/340,958 to Nickurak et al., filed Dec. 30, 2011, entitled "Continuous Protection of Data and Storage Management Configuration," which is incorporated herein by reference, discloses example systems and techniques for synchronizing roll-back of the data on the storage array with roll-back to prior VM states according to storage configuration metadata. Nickurak provides that synchronization may be provided through the use of tags and/or other type of synchronization information for both the data snapshot streams and for the VM configuration metadata snapshot streams. The tags may be attached to the data and configuration streams as the streams are formed and the configuration snapshot stream and the data snapshot stream may be independently separate-able by a user, even though the streams may be synchronized by default, allowing for independent roll-back and roll-forward of data storage or configuration metadata states.

It is noted that to make use of VM snapshots and data storage snapshots, a boot up (or spin up) process is performed on the VM. Specifically, to make use of a VM snapshot, a management layer, such as a hypervisor, of the storage device running the VM boots up (or spins up) a VM copy and loads the VM snapshot before the VM snapshot can run. To make use of a data storage snapshot, the hypervisor running the VM boots-up a VM snapshot taken at the time of taking the data storage snapshot, in order to ensure consistency between the VM snapshot image and the data storage image. In both cases, the VM goes through a boot-up process before the VM can instantiate an application rooted in the snapshot. Thus, the time spent waiting on the boot-up process is spent at the expense of application availability.

The system described herein provides for reducing snapshot instantiation time and thereby decreasing the application's time to recover. In an embodiment, the system described herein provides for unifying the streams of I/O, external VM snapshot triggers and VM internal operations into one in connection with providing for snapshotting of both the data storage of a storage system and one or more associated VMs over time. It is noted that the system described herein may operate in connection with one VM and multiple data storage devices associated therewith. The system described herein thereby allows recording undo and redo journals for all the streams substantially simultaneously. The system described herein unifies snapshots for data storage and all associated VMs in response to one or more triggers. A tag of the unified snapshots may therefore automatically refer to a point-in-time of both the one or more VMs and array data.

Figure 8:
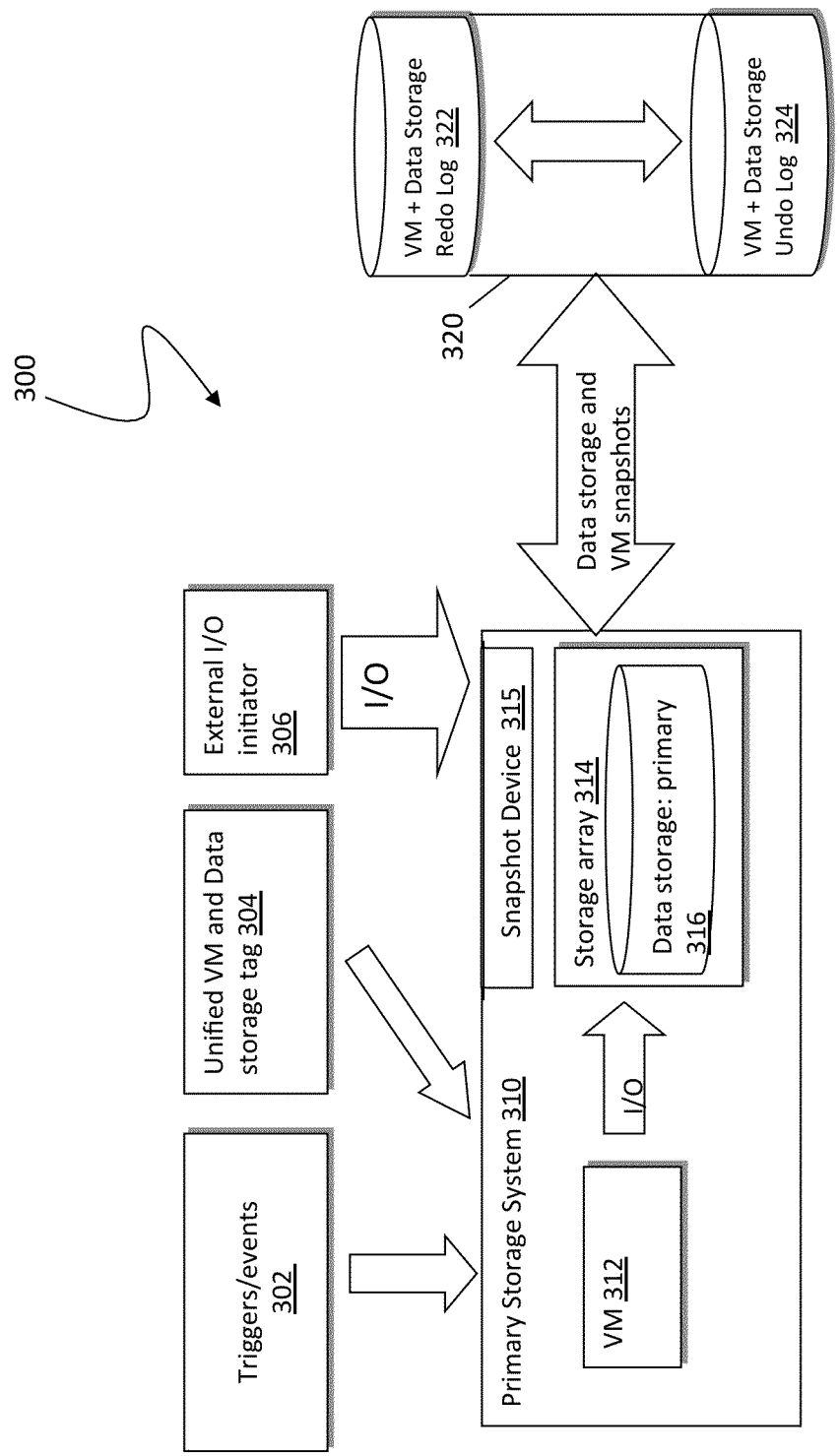
FIG. 8 is a schematic illustration showing unified VM operations and array data streams in a snapshot management system according to an embodiment of the system described herein.

FIG. 8 is a schematic illustration showing unified VM operations and array data streams in a snapshot management system 300 according to an embodiment of the system described herein. A storage system 310 may include a VM 312 performing I/O operations on a data storage array 314 with primary data storage 316. Although one VM 312 is shown, the system described herein may operate in connection with more than one VM and, further, although the VM 312 is shown as part of the storage system 310, in other embodiments, the VM 312 may be located on a separate device. In an embodiment, the storage system 310 may be a live system in which the VM 312 may be a live VM actively running at a data center or other component of a storage system. For a live VM, an operating system running on the VM does not need to be restarted in connection with the system described herein. Accordingly, embodiments of the system described herein, enable modifying the VM state to a previous point-in-time while the live VM is running and/or freezing the VM, rolling back or forward using stored point-in-time images (snapshots), and resuming operation of the live VM. Although the storage system 310 is shown as a unit, in various embodiments, the components of the storage system 310 may operate in connection with a network and include cloud processing features and functions. The VM 312 may perform I/O operations on the data storage array 314 that may include primary data storage. As further discussed elsewhere herein, the system described herein may also operate in connection with data replication, in which case one or more data storage arrays may provide for primary and replica (e.g., backup) data storage.

A snapshot device 315 obtains the snapshots of both the data storage in the data storage array 314 and the state of the VM 312 and creates a unified snapshot image of the data storage and VM. The snapshot device 315 is shown as a component of the storage system 310; however, in other embodiments, the snapshot device 315 may be a separate device from the storage system 310. A trigger/event 302 is shown as an input to the storage system 310. The trigger may, for example, be a user action, a command, a result of a I/O operation or failure condition and/or any other appropriate trigger that triggers the obtaining of a unified VM and data storage snapshot according to the system described herein. As illustrated, a unified VM and data storage tag 304 may be applied to each unified VM and data storage snapshot. The tag 304 is shown as an input to the system 310 and may be generated by a separate device; however, in other embodiments, the storage system 310 itself may generate and apply the unified tag 304. In an embodiment, the tag 304 may be a VM and data storage continuous snapshotting tag.

A journal (or log) device 320 is shown that may include database components for both redo 322 and/or undo 324 journal logs. As illustrated, according to the system described herein, the one or more journal logs (redo 322 and/or undo 324) of the journal device 320 may each store the journal entries for both the VM snapshots and the data storage snapshots as a unified snapshot image resulting from the unified VM and data storage snapshot streams. It is noted that although one VM is shown and principally described, the unified VM and data storage snapshots may include all associated VMs of a data storage array, which may be more than one VM. With a combined VM and data storage image, rolling back (or forward) is provided concurrently in a coordinated fashion such that the system presents a combined existence/history of the VM and data storage array using unified snapshot images.

It is noted that I/O operations may be performed on the storage array 314 from an external I/O initiator 306. Such I/O operations may or may not be triggers for a unified VM and data storage snapshot processing according to the system described herein. In the case of an I/O operation from the external I/O initiator 306, the state of the data storage of the storage array 314 reflects the I/O operation, which would be included in the next triggered VM and data storage snapshot according to the system described herein.

In various embodiments, the system described herein enables the log(s) 322, 324 of the journal device 320 to absorb log writes synchronously or asynchronously. In an embodiment in connection with asynchronous operation, the system described herein may be used in connection with asynchronous technologies such as VPLEX/Async by EMC Corporation of Hopkinton, Mass. Since synchronization of the streams is provided by the unifying of the multiple VM and I/O streams, including the VM operations, I/O operations and VM trigger information, although the journal entries may be written asynchronously from the actual obtaining of the VM and data storage snapshots, the snapshots remain synchronized when the log writes are later (asynchronously) written to the logs 322, 324. This may be useful to minimize the impact of snapshotting operations on the running VM, as VM operations are timing sensitive.

The system described herein provides the capability of rolling back live VMs. It is also noted that the system herein further enables roll-forward using similar features and functionality as the roll-back capabilities described herein. In an embodiment, roll-back (or roll-forward) of live VMs may be provided by the system described herein by allowing an online instantiation of a unified VM and data storage snapshot. The system described herein thereby allows a VM to resume instantly from the exact operation that was last played according to the snapshot without the need to boot up a copy of the VM. In an embodiment, a live image of the VM may be isolated from external triggers and only changes tracked through replay of the undo/redo logs of the journal device, before resuming normal operation of the live VM image, as further discussed elsewhere herein.

In another embodiment, the system described herein provides the capability to a VM player engine to replay operations/instructions/triggers in reverse using the unified snapshot to revert to different state from a current state. In some cases, only a subset of the operations could be replayed in reverse, as some operations have memory effects which cannot be undone without accessing memory contents. For example, a simple register increment may be undone by playing the increment in reverse (by decrementing). However, memory copy operations to previously initialized target memory regions may not fully be played in reverse since during the original operation overwrote memory contents which can only be recovered from a snapshot/journal. Accordingly, the use of a unified snapshot (VM and data storage) provides enhances ability to replay operations/instructions/triggers in reverse. In an embodiment, the reverse operation may be an optimization that uses the inverse of the operations in the undo log. For example, instead of reinstantiating a memory cell to a value prior to an increment, the implementation would issue a decrement (inverse operation).

In another embodiment, an interface may be provided as part of the storage systems that enables a user to watch play forward/backward (replay or reverse) of the VM operations according to the system described herein. In an embodiment, the interface may further enable control of the play forward and backward (replay or reverse operations) according to controlled settings, such as at variable CPU speeds.

In another embodiment, VM roll-back may be provided for VMs running directly on the storage array hardware (for example, VPLEX) according to the system described herein. The VM's image could run on a memory-mapped file. The file (backing the memory map) would reside in a device which the storage array would protect using the journal. Replaying the journal would then allow reading and instantiating a VM snapshot which has a corresponding data snapshot through volumes managed by the same storage array.

In another embodiment, the system described herein provides the ability to read from the unified undo log and play the contents thereof directly into both the storage array and VM(s) and taking advantage of the ability to roll-back live VMs. As the undo log is read and the undo operations applied to both VMs and storage arrays, the VM operations that are "undone," as well as the array data values being "undone," may be recorded in the redo log. Similarly, external triggers to the VMs as well as data I/O from alternate sources (external I/O initiator) is now captured in the redo log.

In another embodiment, the system described herein provides the ability to read the unified redo log directly into both the storage array and associated VMs. The contents of the redo log may contain both "undone" VM and data content operations, as well as any new VM operations and data stored in the redo log while using the undo log for rollback.

In an embodiment, the system described herein may be used to wrap applications which do not have roll-back support in VMs which can then be rolled back and forward, to attempt trial-and-error/greedy steps towards an application goal. For example, a financial firm may want to simulate a number of what-if scenarios, using genetic algorithms on an application which does not have native roll-back/roll-forward capability. For the financial firm, an option would be to make use of a VM hypervisor to instruct the VM and the simulation program to take some trial steps, evaluate the results, and roll-back fast every time the results are undesired.

Figure 9:
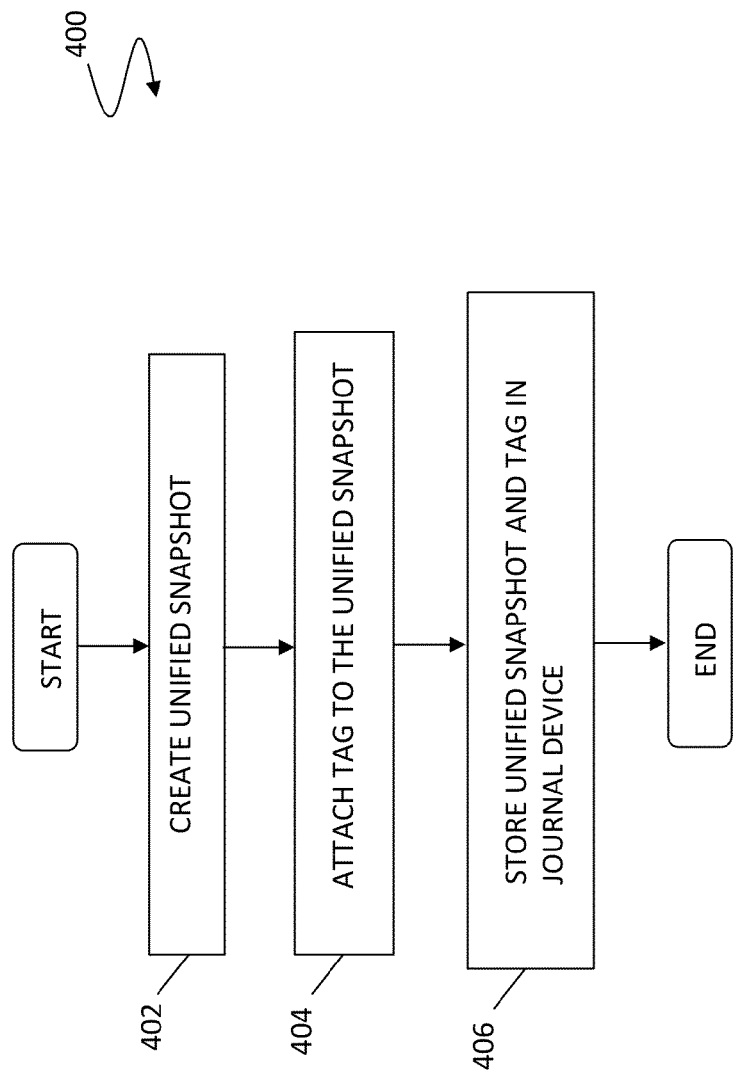
FIG. 9 is a flow diagram showing unified VM and data storage snapshot processing in a snapshot management system according to an embodiment of the system described herein.

FIG. 9 is a flow diagram 400 showing unified VM and data storage snapshot processing in a snapshot management system according to an embodiment of the system described herein. At a step 402, a unified snapshot, and/or other appropriate point-in-time image, is created of the snapshot management system that includes a point-in-time image of data storage and of a state of one or more associated VMs. The snapshot may be created in connection with a continuous protection system following a trigger action and/or event. After the step 402, at a step 404, a tag may be attached to the unified snapshot allowing for the unified snapshot to be identified in accordance with the system described herein. In various embodiments, the tag may include timer and/or cycle count information and may be human-readable via a user interface. The tag may be used in connection with features of write-order-fidelity processing in connection with multiple unified snapshots. After the step 404, processing proceeds to a step 406 where the unified snapshot is stored in a journal device. As further discussed elsewhere herein, in an embodiment, the system described herein enables the journals of the journal device to store the log writes asynchronously with the creation of the unified snapshots. After step 406, processing is complete.

Figure 10:
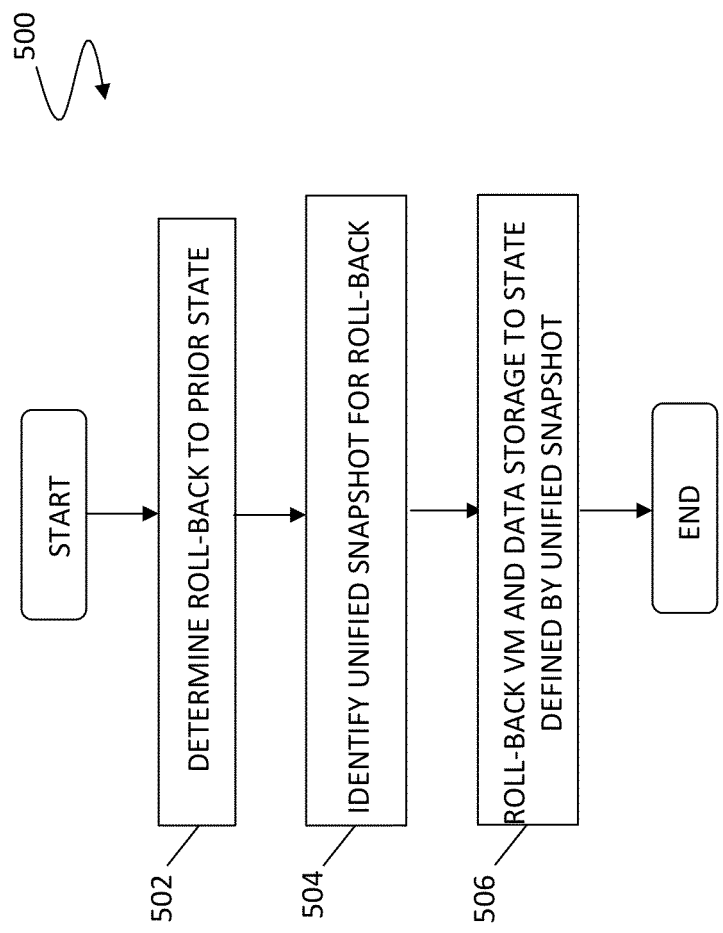
FIG. 10 is a flow diagram showing roll-back processing according to an embodiment of the system described herein.

FIG. 10 is a flow diagram 500 showing roll-back processing according to an embodiment of the system described herein. At a step 502, a determination is made to roll-back to a prior state for which snapshots are available for the roll-back. After the step 502, processing proceeds to a step 504 where a unified VM and data storage snapshot for the desired roll-back state is identified, for example, using a tag of the unified snapshot that was attached when the unified snapshot was obtained. The unified VM and data storage snapshot is a point-in-time image of both a state of the VM and a state of the data storage taken at the same time. After the step 504, processing proceeds to a step 506 where roll-back of the VM and data storage is performed using the selected unified VM and data storage snapshot. After the step 506, processing is complete.

Similar steps as those discussed herein may be also be performed in connection with roll-forward processing.

Figure 11:
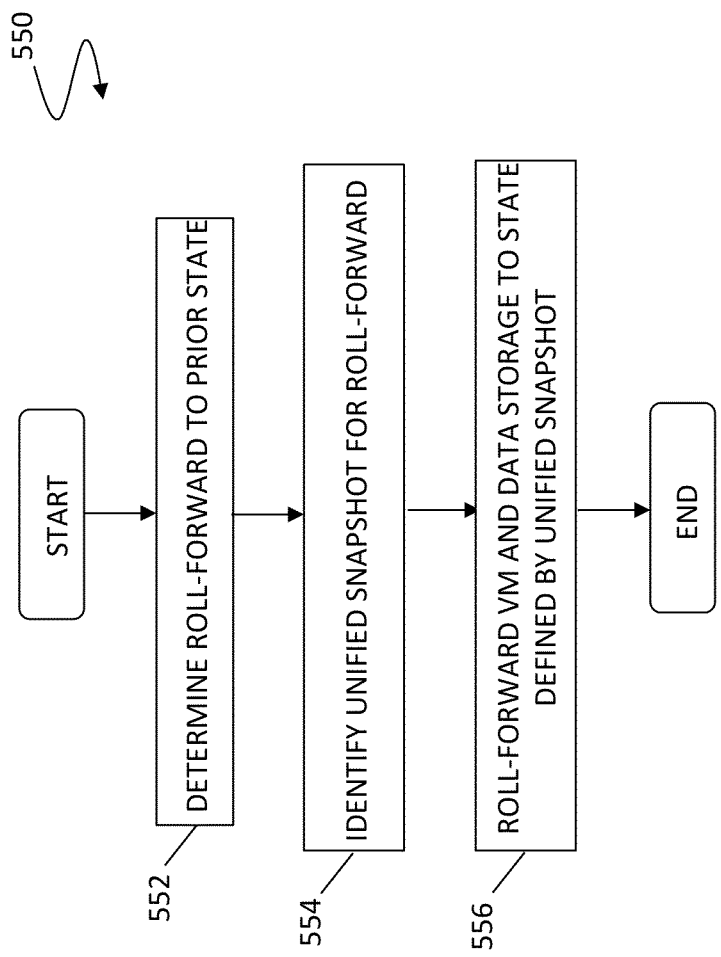
FIG. 11 is a flow diagram showing roll-forward processing according to an embodiment of the system described herein.

FIG. 11 is a flow diagram 550 showing roll-forward processing according to an embodiment of the system described herein. At a step 552, a determination is made to roll-forward to a state for which snapshots are available for the roll-forward. For example, a roll-forward may be performed after a roll-back has been performed according to the system described herein. After the step 552, processing proceeds to a step 554 where a unified VM and data storage snapshot for the desired roll-forward state is identified, for example, using a tag of the unified snapshot that was attached when the unified snapshot was obtained. The unified VM and data storage snapshot is a point-in-time image of both a state of the VM and a state of the data storage taken at the same time. After the step 554, processing proceeds to a step 556 where roll-forward of the VM and data storage is performed using the selected unified VM and data storage snapshot. After the step 556, processing is complete.

It is noted that the system described herein may be used in connection with other snapshotting systems. For example, the system described herein may be used in connection with systems utilizing independent VM and data storage snapshots in circumstances where a unified roll-back of both VM and data storage is not required and/or desired. In such circumstances, the system described herein may be used in connection with the independent roll-back or roll-forward of the VM and/or the data storage.

Additionally, where snapshots of the VM and data storage are made at independent times, a notification of the snapshots may be recorded in the journal device. In such case, the system described herein may subsequently create a unified image of the VM(s) and associate storage using the snapshots and notifications. The system described herein may also be used in connection with partially unified point-in-time copies of storage and VMs.

According further to the system described herein, the system described herein may allow live access to roll-back and roll-forward snapshots on a combined set (replica) of secondary VMs and storage array snapshots, while the original set (primary) of VMs and data array continue on their original execution course. The second set (replica) of VMs and data storage array can also serve for failover purposes.

Figure 12:
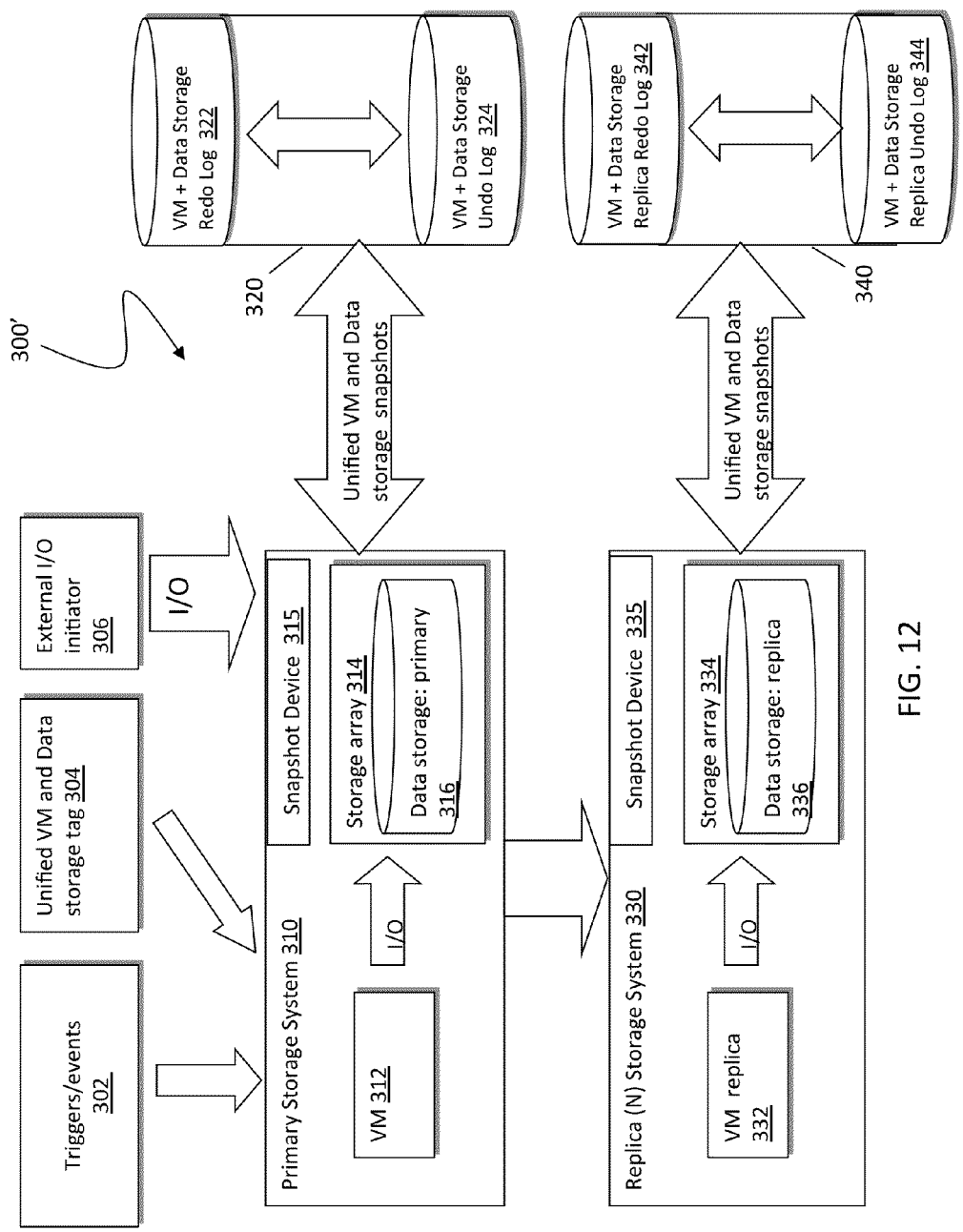
FIG. 12 is a schematic illustration of a snapshot management system further including additional (N) replica storage systems according to an embodiment of the system described herein.

FIG. 12 is a schematic illustration of a snapshot management system 300', like the snapshot management system 300, but further including additional (N) replica storage systems. One or more (N) replica storage systems 330 may include a VM replica 332 and storage array 334 with replica data storage that may provide a replica storage system of the primary storage system 310. In an embodiment, both the primary storage system 310 and the replica storage system 330 may be live. A snapshot device 335 creates unified VM and data storage snapshots, as further discussed elsewhere herein. As with the primary storage system 310, a write-ordered stream of unified VM and data storage snapshots stored in a journal device 340 ensures that the replica storage system 330 is subject to continuous protection and is crash consistent. Note that one primary live system can have multiple live replica systems (1:N). This would allows for multiple active snapshots that may be running at different points in time.

An appropriate process may link and unlink the primary system to and from the replica system consistent with appropriate back-up processing for a system subject to data mirroring/replication. The unified VM+data storage snapshot stream between the two can be viewed as being implemented through replication. When the replication mode is write through/sync, crash consistency is ensured implicitly. When the storage array is in write back/async mode, in order to ensure crash consistency, additional coordination (e.g., through messaging) may be provided between the VM and the array/primary data storage to ensure that the flow to the replica storage system is cut off at delta set boundaries.

A stream of updates may be combined simultaneously from the primary VM and the primary data storage, into an undo log (and, on replay, a redo log). The replica redo and undo logs may be fed by the unified snapshot. Upon a crash of the live primary storage system 310, the live replica storage system 330 may immediately continue from the last operation and state of the live primary storage system 310 using the coordinated replica data storage 336 on the storage array 334.

The replica storage system 330 may make use of the combined VM+Data Storage Replica Redo/Undo Logs 342, 344 of the journal device 340 to instantiate an image from a previous point in time. This image is simultaneously instantiated for both the VM and its data storage, through undo/backwards play of the operations stored in the undo log. During the backwards play of the undo log, the operations that were already mirrored by the "Live primary system" to the "Live Replica System" are now recorded into the redo log of the latter, for later roll-forward. In an embodiment, in a data mirroring/replication system, the primary storage system 310 may still has its own pair of VM+Data Storage Primary Undo/Redo Logs of a journal device 320, since the roles of the primary storage system 310 and replica storage system 330 may be reversed, and/or interchangeable, on demand.

Although the system described herein has been discussed in connection with the use of tracks as a unit of data for certain purposes, it should be understood that the system described herein may be used with any appropriate units or structures of data, such as tracks, and further including, possibly, variable length units of data. It is also noted that one or more storage devices having components as described herein may, alone or in combination with other devices, provide an appropriate platform that executes any of the steps described herein. The system may operate with any snapshot mechanism not inconsistent therewith and further with any appropriate point-in-time copy mechanism.

Various embodiments discussed herein may be combined with each other in appropriate combinations in connection with the system described herein. Additionally, in some instances, the order of steps in the flowcharts, flow diagrams and/or described flow processing may be modified, where appropriate. Further, various aspects of the system described herein may be implemented using software, hardware, a combination of software and hardware and/or other computer-implemented modules or devices having the described features and performing the described functions. Software implementations of the system described herein may include executable code that is stored in a computer readable medium and executed by one or more processors. The computer readable medium may include volatile memory and/or non-volatile memory, and may include, for example, a computer hard drive, ROM, RAM, flash memory, portable computer storage media such as a CD-ROM, a DVD-ROM, a flash drive and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method for performing point-in-time image processing in a storage system, comprising:
creating a unified point-in-time image of data storage in the storage system and a state of a virtual machine associated with the data storage in the storage system, wherein the unified point-in-time image combines information of the data storage and the state of the virtual machine;
storing the unified point-in-time image in a journal device, wherein the unified point-in-time image enables the storage system to revert from a current state operating with a current data storage state and current state of the virtual machine to a point-in-time operational state defined by the data storage and the state of the virtual machine according to the unified point-in-time image stored in the journal device;
maintaining the virtual machine in the current state;
instantiating a new virtual machine; and
operating the new virtual machine in the point-in-time state using the unified point-in-time image stored in the journal device.

2. The method according to claim 1, further comprising:
accessing the unified point-in-time image to revert a state of the storage system from the current state to the point-in-time state defined by the unified point-in-time image, wherein the state defined by the unified point-in-time image includes the data storage and the state of the virtual machine according to the unified point-in-time image for a desired point-in-time.

3. The method according to claim 2, wherein the virtual machine is operating live when the state of the storage system is reverted to the state defined by the unified point-in-time image.

4. The method according to claim 2, further comprising:
isolating the virtual machine from external triggers;
rolling back or rolling forward to the state defined by the unified point-in-time image; and
resuming operation of the virtual machine.

5. The method according to claim 1, wherein storing the unified point-in-time image in the journal device is performed asynchronously with creating the unified point-in-time image.

6. The method according to claim 1, further comprising:
tagging the unified point-in-time image with an identifier.

7. The method according to claim 1, wherein the journal device includes a redo log and an undo log.

8. The method according to claim 7, further comprising:
accessing the journal device to revert a state of the storage system from the current state to the point-in-time state defined by the unified point-in-time image by replaying or reversing actions represented in the journal device using the redo log or the undo log.

9. The method according to claim 8, wherein reversing the actions represented in the journal log includes performing inverse operations of the undo log.

10. The method according to claim 8, wherein replaying or reversing the actions represented in the journal log are performed using a variable CPU speed.

11. A non-transitory computer readable medium storing software for performing point-in-time image processing in a storage system, the software comprising:
executable code that creates a unified point-in-time image of data storage in the storage system and a state of a virtual machine associated with the data storage in the storage system, wherein the unified point-in-time image combines information of the data storage and the state of the virtual machine;
executable code that stores the unified point-in-time image in a journal device, wherein the unified point-in-time image enables the storage system to revert from a current state operating with a current data storage state and current state of the virtual machine to a point-in-time operational state defined by the data storage and the state of the virtual machine according to the unified point-in-time image stored in the journal device;

executable code that maintains the virtual machine in the current state;

executable code that instantiates a new virtual machine; and executable code that operates the new virtual machine in the point-in-time state using the unified point-in-time image stored in the journal device.

12. The non-transitory computer readable medium according to claim 11, wherein the software further comprises:

executable code that accesses the unified point-in-time image to revert a state of the storage system from the current state to the point-in-time state defined by the unified point-in-time image, wherein the point-in-time state defined by the unified point-in-time image includes the data storage and the state of the virtual machine according to the unified point-in-time image for a desired point-in-time.

13. The non-transitory computer readable medium according to claim 12, wherein the virtual machine is operating live when the state of the storage system is reverted to the state defined by the unified point-in-time image.

14. The non-transitory computer readable medium according to claim 12, wherein the software further comprises:

executable code that isolates the virtual machine from external triggers;

executable code that rolls back or rolls forward to the state defined by the unified point-in-time image; and executable code that resumes operation of the virtual machine.

15. The non-transitory computer readable medium according to claim 11, wherein storage of the unified point-in-time image in the journal device is performed asynchronously with creation of the unified point-in-time image.

16. The non-transitory computer readable medium according to claim 11, wherein the software further comprises:

executable code that tags the unified point-in-time image with an identifier.

17. The non-transitory computer readable medium according to claim 11, wherein the journal device includes a redo log and an undo log.

18. The non-transitory computer readable medium according to claim 17, further comprising:

executable code that accesses the journal device to revert a state of the storage system from the current state to the point-in-time state defined by the unified point-in-time image by replaying or reversing actions represented in the journal device using the redo log or the undo log.

19. The non-transitory computer readable medium according to claim 18, wherein reversing the actions represented in the journal log includes performing inverse operations of the undo log.

20. The non-transitory computer readable medium according to claim 18, wherein replaying or reversing the actions represented in the journal log are performed using a variable CPU speed.

21. A point-in-time image processing system, comprising:

a storage system having at least one processor and a data array that is accessed by at least one virtual machine operating on the storage system;

a point-in-time image device that creates a unified point-in-time image of data storage in the storage system and a state of a virtual machine associated with the data storage in the storage system, wherein the unified point-in-time image combines information of the data storage and the state of the virtual machine;

a journal device that stores the unified point-in-time image in a journal device, wherein the unified point-in-time image enables the storage system to revert from a current state operating with a current data storage state and current state of the virtual machine to a point-in-time operational state defined by the data storage and the state of the virtual machine according to the unified point-in-time image stored in the journal device; and a non-transitory computer readable medium storing software, the software including:

executable code that maintains the virtual machine in the current state;

executable code that instantiates a new virtual machine; and executable code that operates the new virtual machine in the point-in-time state using the unified point-in-time image stored in the journal device.

22. The point-in-time image processing system according to claim 21, further comprising:

an accessing device that accesses the unified point-in-time image to revert a state of the storage system from the current state to the point-in-time state defined by the unified point-in-time image, wherein the point-in-time state defined by the unified point-in-time image includes the data storage and the state of the virtual machine according to the unified point-in-time image for a desired point-in-time.

* * * * *